United States Patent [19]
Misner et al.

[11] Patent Number: 6,133,530
[45] Date of Patent: Oct. 17, 2000

[54] PROTECTIVE COVER APPARATUS AND METHOD

[75] Inventors: Emily K. Misner, Buffalo Grove; Daniel J. Lecinski, Arlington Heights; Susan I. English, Chicago; Kenneth S. Laughlin, Arlington Heights; Joseph M. August, Elgin, all of Ill.

[73] Assignee: 3COM Corporation, Rolling Meadows, Ill.

[21] Appl. No.: 09/031,945

[22] Filed: Feb. 27, 1998

[51] Int. Cl.⁷ .................................................... H02G 3/14
[52] U.S. Cl. ............................................. 174/66; 220/241
[58] Field of Search ............................. 174/66; 220/3.8, 220/241; 33/528, DIG. 10

[56] References Cited

U.S. PATENT DOCUMENTS

| | | | |
|---|---|---|---|
| 3,363,797 | 1/1968 | Roese | 174/66 X |
| 4,163,137 | 7/1979 | Close, Jr. | 174/66 X |
| 4,335,863 | 6/1982 | Rapps | 174/66 X |
| 4,345,381 | 8/1982 | Brislin | 33/DIG. 10 X |
| 4,353,759 | 10/1982 | Stallings | 220/241 X |
| 4,636,273 | 1/1987 | Wolfersperger . | |
| 5,212,899 | 5/1993 | Fandreyer . | |
| 5,301,437 | 4/1994 | Burke | 33/528 X |
| 5,321,206 | 6/1994 | Hibler . | |
| 5,693,991 | 12/1997 | Sydow | 174/66 |
| 5,747,738 | 5/1998 | Indoe | 174/66 |

*Primary Examiner*—Dean A. Reichard
*Attorney, Agent, or Firm*—Baniak Nicholas Pine & Gannon

[57] ABSTRACT

An apparatus and method for covering an open end of a cable trough mounted in a cabinet for housing electronic devices includes a planar member for covering the opening of the cable trough. The planar member includes a front side, a back side, and an outer edge. The planar member also includes a perforated portion and a perimeter portion. The perforated portion is substantially surrounded by the perimeter portion. The back side of the planar member includes an adhesive material for securing the planar member to an outer wall of the cabinet. The perforated portion may also include a tab portion to allow for the removal of the perforated portion to allow access to the cable trough.

15 Claims, 3 Drawing Sheets

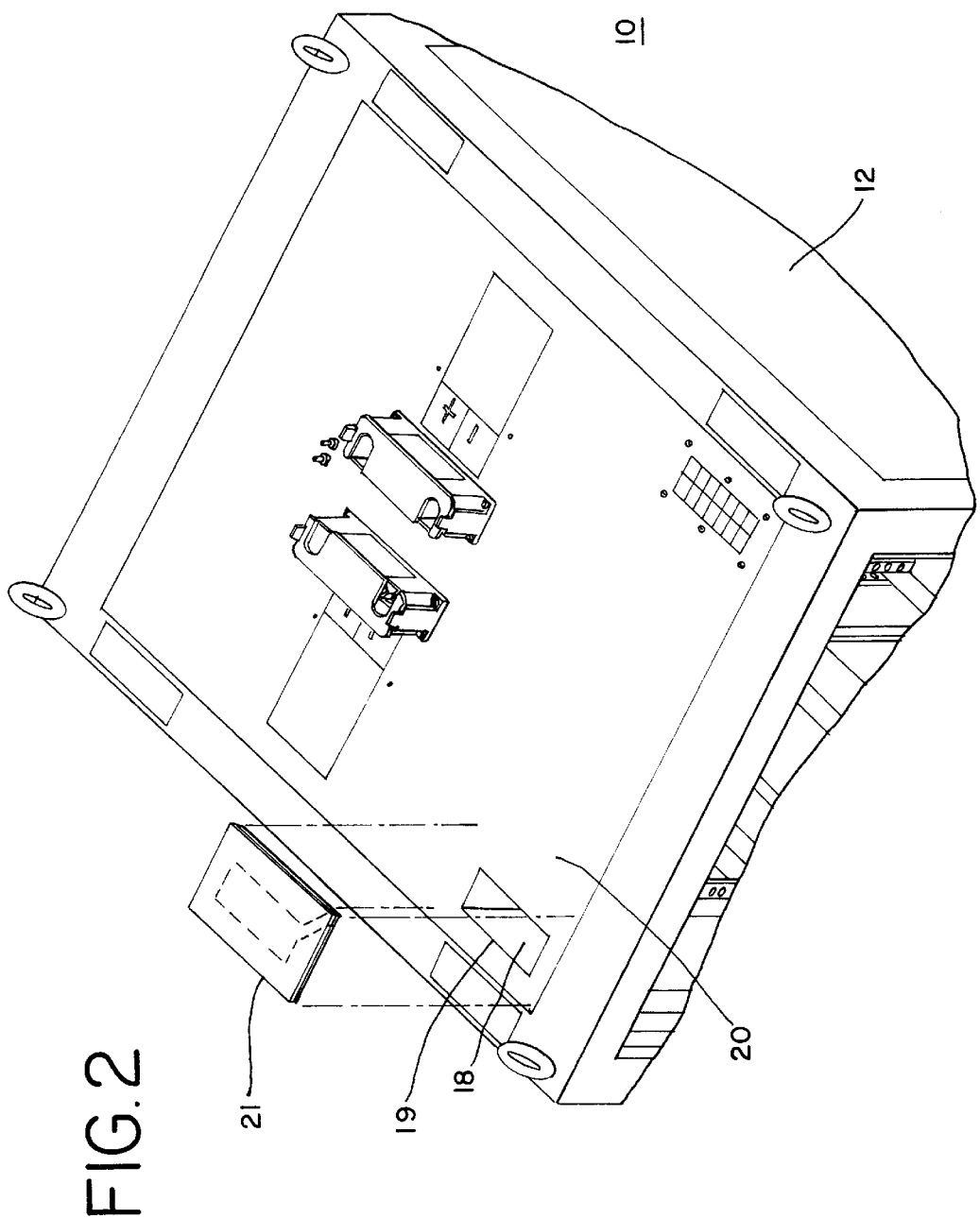

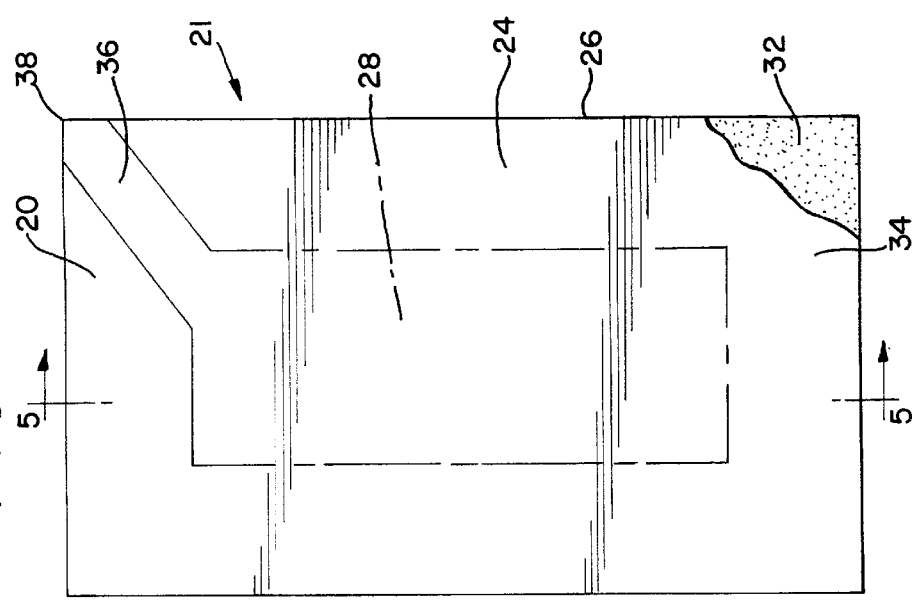
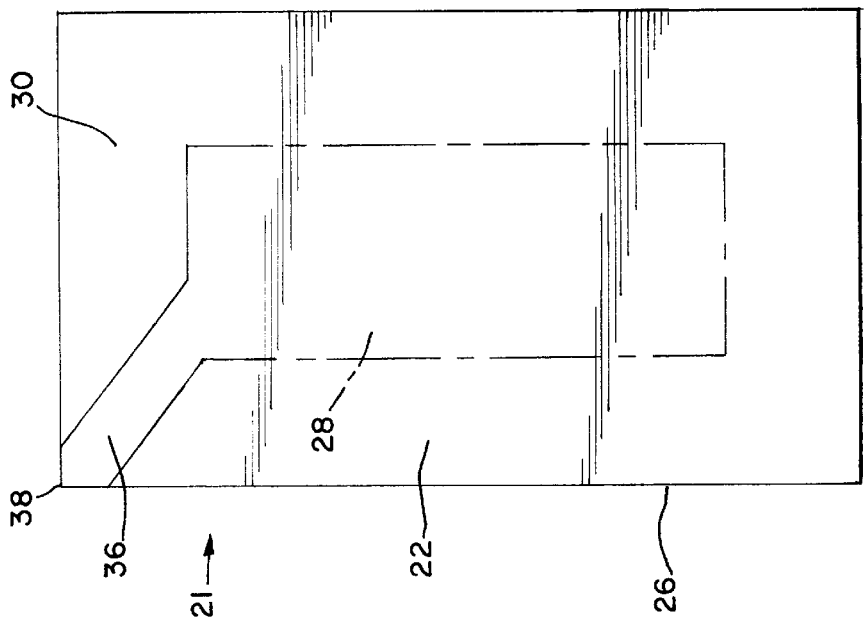

PROTECTIVE COVER APPARATUS AND METHOD

FIELD OF THE INVENTION

This invention relates generally to the field of protective covers for cable troughs, and in particular, to a protective cover that covers an open end of a cable trough mounted in a cabinet for housing electronic devices.

BACKGROUND OF THE INVENTION

Electronic devices, such as network access servers, are typically housed in a cabinet in a vertically stacked configuration. The cabinet typically has a power entry terminal which is located on the top wall of the cabinet to receive power supplied from an overhead power source. However, if the power source is located below the floor, a power cable must be routed from the power source to the cabinet's power entry terminal. This is typically accomplished by routing the power cable in a cable trough which is mounted vertically inside the cabinet. One open end of the cable trough is aligned with an opening in the bottom wall of the cabinet and the other end is aligned with an opening in the top wall of the cabinet. In particular, the power cable is routed up from the floor, through the opening in the bottom wall of the cabinet, through the cable trough, and through the opening in the top wall of the cabinet for connection to the cabinet's power entry terminal.

When power is supplied from an overhead source, there is no need to access the opening in the top wall of the cabinet. To prevent unwanted foreign objects from falling into the opening and down the cable trough, a rigid cover is typically secured to the top wall of the cabinet by screws or other fastening means to cover the opening. The disadvantage of this arrangement is that the cover must be sized to fit the particular shape of the opening to be covered. Moreover, an electrician must use a tool, such as a screwdriver, to secure the cover to the top wall of the cabinet. Similarly, if power is to be supplied from the floor and the opening in the top wall of the cabinet must be accessed to receive a power cable from below, an electrician must use a tool to remove the cover. This substantially increases the time required for an electrician to make the necessary electrical connections thereby increasing the costs associated with the installation of the cabinet.

Accordingly, it would be desirable to have a protective cover apparatus that overcomes the disadvantages described above, and to provide a simple and cost effective protective cover apparatus.

SUMMARY OF THE INVENTION

One aspect of the invention provides a protective cover apparatus for covering an open end of a cable trough mounted in a cabinet for housing electronic devices. A planar member for covering the open end of the cable trough includes a front side, a back side, and an outer edge. The planar member includes a perforated portion and a perimeter portion, the perforated portion is substantially surrounded by the perimeter portion. The back side of the planar member includes an adhesive material for securing the planar member to an outer wall of the cabinet. The perforated portion may include a tab portion to allow for the removal of the perforated portion. The tab portion may extend to the outer edge of the planar member. The planar member, as well as the perforated portion and the perimeter portion, may have a substantially rectangular shape. The tab portion may extend to a corner of the planar member to allow for easy removal of the perforated portion. The planar member may include a backing material covering the adhesive material. The planar member may be comprised of a flexible, insulative material such as, for example, a polycarbonate.

Another aspect of the invention provides a protective cover apparatus for covering an open end of a cable trough mounted in a cabinet for housing electronic devices. A cabinet opening is formed in an outer wall of the cabinet and is aligned with the open end of the cable trough. A planar member is secured to the outer wall of the cabinet and covers the cabinet opening. The planar member includes a front side, back side, a perforated portion, and a perimeter portion. The perforated portion is substantially surrounded by the perimeter portion. The back side of the planar member includes an adhesive material for securing the planar member to the outer wall of the cabinet. The outer wall of the cabinet may be a top wall. The planar member may be comprised of a flexible, insulative material including, for example, a polycarbonate.

Another aspect of the invention provides a method for covering an open end of a cable trough mounted in a cabinet for housing electronic devices. A planar member including a front side and a back side is provided. The planar member includes a perforated portion substantially surrounded by a perimeter portion. The back side of the planar member includes an adhesive material. A backing material is removed from the adhesive material. The back side of the planar member is applied to an outer wall of the cabinet.

Another aspect of the invention provides a method for covering an open end of a cable trough mounted in a cabinet for housing electronic devices. The cabinet including an outer wall is provided. A cabinet opening formed in the outer wall aligned with the open end of the cable trough is also provided. A planar member secured to the outer wall of the cabinet and covering the cabinet opening is also provided. The planar member includes a front side, back side, a perforated portion, and a perimeter portion. The perforated portion is substantially surrounded by the perimeter portion. The perforated portion includes a tab portion. The back side of the planar member includes an adhesive material for securing the planar member to the outer wall of the cabinet. The tab portion is pulled to remove the perforated portion. The cabinet opening and the open end of the cable trough are exposed to allow for the passage of a cable. The cable may be a power cable, which may be routed through the cable trough and through the cabinet opening.

The invention provides the foregoing and other features, and the advantages of the invention will become further apparent from the following detailed description of the presently preferred embodiments, read in conjunction with the accompanying drawings. The detailed description and drawings are merely illustrative of the invention and do not limit the scope of the invention, which are defined by the appended claims and equivalents thereof.

DETAILED DESCRIPTION OF THE DRAWINGS

FIG. 2 is an exploded perspective view of the planar member of the embodiment of FIG. 1.

FIG. 3 is a front view of the planar member of the embodiment of FIG. 2.

FIG. 4 is a back view of the planar member of FIG. 3.

FIG. 5 is an enlarged sectional view taken along line 5—5 of the embodiment of FIG. 4.

DETAILED DESCRIPTION OF THE PRESENTLY PREFERRED EMBODIMENTS

Figure 1:
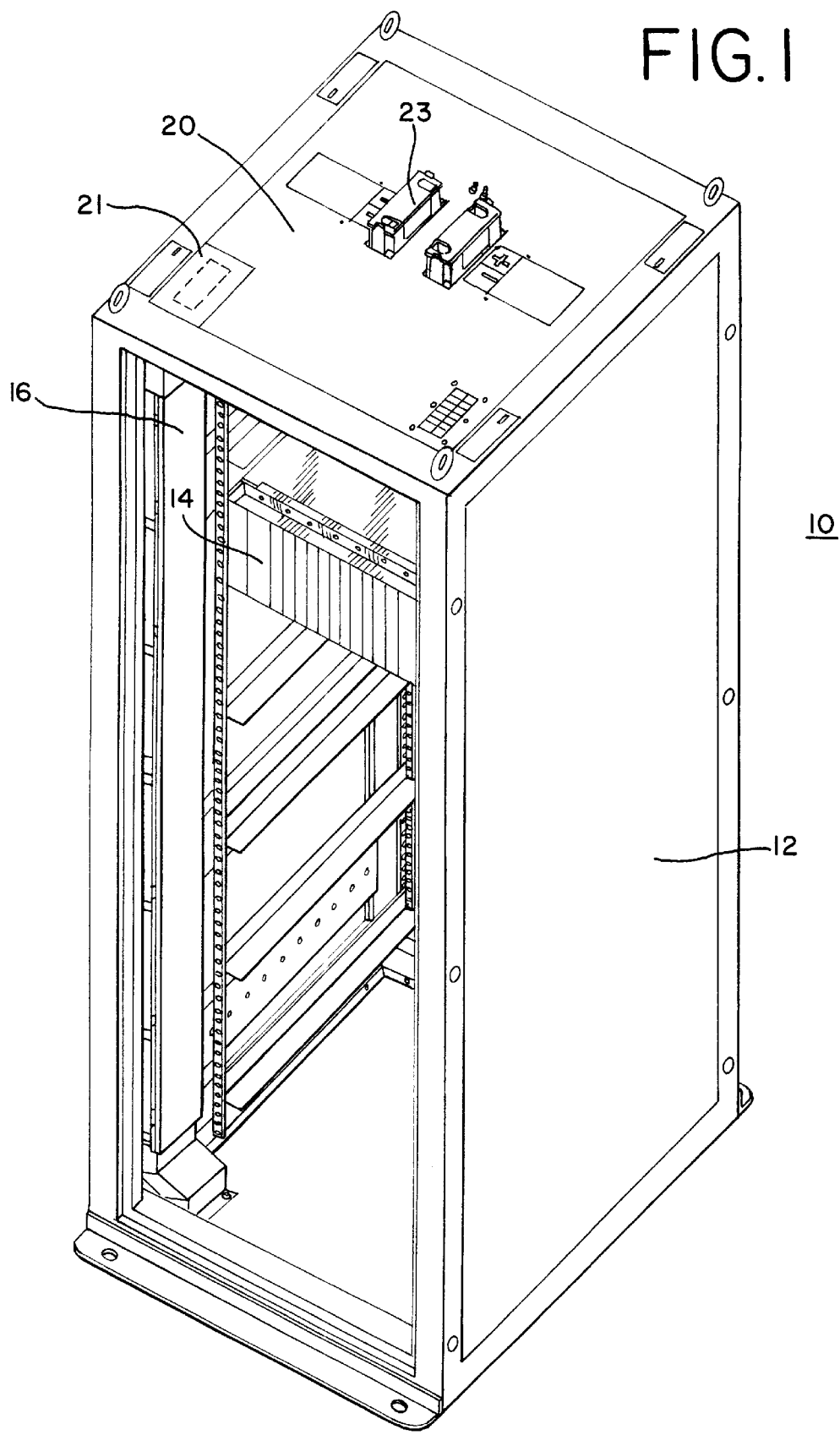
FIG. 1 is a perspective view of a preferred embodiment of a protective cover apparatus which is made in accordance with the invention.

As shown in FIGS. 1–2, a preferred embodiment of a protective cover apparatus 10 includes a cabinet 12 for housing electronic devices 14, and a cable trough 16 for routing cables mounted within the cabinet 12. In the embodiment shown, the cable trough 16 is vertically oriented in the cabinet and includes an open end 18 which is aligned with an opening 19 formed in an outer wall 20 of the cabinet 12. In the embodiment shown, the outer wall 20 is the top wall of the cabinet 12.

Referring to FIGS. 1–5, a planar member 21 for covering the open end 18 of the cable trough 16 includes a front side 22 a back side 24, and an outer edge 26. The planar member 21 also includes a perforated portion 28 and a perimeter portion 30. Referring to FIGS. 3–4, the perforated portion 28 is substantially surrounded by the perimeter portion The planar member 21 may be comprised of a flexible, insulative material including, for example, any polycarbonate, such as LEXAN™ which is manufactured and supplied by General Electric. Alternatively, the planar member 21 may be comprised of, for example, vinyl, polystyrene, or polyester. In the embodiment shown, the planar member 21 has a substantially rectangular shape. The shape of the planar member 21 may vary depending on the particular application. The thickness of the planar member 21 may preferably range from about 0.006 inches to 0.040 inches depending on the amount of rigidity that is required for a particular application. For the embodiment shown, for example, the thickness of the planar member 21 is 0.020 inches.

As shown in FIGS. 4–5, the back side 24 of the planar member 21 includes an adhesive material 32 for securing the planar member 21 to the top wall 20 of the cabinet 12. The adhesive material may be any of the commercially available adhesives such as, for example, the Scotch 468MP Hi performance adhesive supplied by the 3M Corporation. Alternatively, other adhesives suitable for securing the planar member 21 to the top wall of the cabinet 12 may be used.

As shown in FIGS. 4–5, the planar member 21 may preferably include a backing material 34 covering the adhesive material 32. The backing material 34 may be any of the commercially available backing materials such as that supplied by the 3M Corporation.

Referring to FIGS. 3–4, the perforated portion 28 may include a tab portion 36 to allow for the removal of the perforated portion 28. The tab portion 36 may preferably extend to the outer edge 26 of the planar member 18. In the embodiment shown, the tab portion 36 extends to a corner 38 of the planar member 21. This configuration enables the user to more easily grasp the tab portion 36 to remove the perforated portion 28. Alternatively, the tab portion 36 may extend to any point along the outer edge 26 of the planar member 21. The perforated portion 28 and the perimeter portion 30 may each have a substantially rectangular shape. Alternatively, the shape of the perforated portion 28 and the perimeter portion 30 may vary depending on the shape and location of the opening 19 in the top wall 20 of the cabinet 12.

Cabinet 12 may have a power entry terminal 23 located at the top of the cabinet 12 for receiving power. When power is supplied from an overhead source, there may be no need to access the opening 19 formed in the top wall 20 of the cabinet 12. In this scenario, it would be desirable to cover the opening 19 to prevent unwanted foreign objects from failing through the opening 19 and into the cable trough 16.

The planar member 21 as shown in FIGS. 1–5 is used for covering an open end 18 of a cable trough 16 mounted in cabinet 12 for housing electronic devices 14. The backing material 34 is removed from the adhesive material 32. The back side 24 of the planar member 21 is applied to the top wall 20 of the cabinet 12 thereby covering the open end 18 of the cable trough 16.

When power is supplied from the floor, a power cable must be routed up from the floor, through the cable trough 16 and through the opening 19 for connection to the power entry terminal 23 of the cabinet 12. To gain access to the opening 19 formed in the top wall 20 of the cabinet 12, the tab portion 36 is pulled to remove the perforated portion 28 thereby exposing the opening 19 and the open end 18 of the cable trough 16 to allow for the passage of a cable such as, for example, a power cable. One advantage of this invention is that the planar member 21 which serves as the protective cover can be easily and quickly installed without the need for any tools. Moreover, if access to the cable trough 16 is required, the user can easily and quickly remove the perforated portion 28 by simply pulling on the tab portion 36 thereby exposing the opening 19 formed in the top wall 20 of the cabinet 12 and the open end 18 of the cable trough 16. The removal of the perforated portion 28 does not require the use of any tools which, as a result, saves time and reduces installation costs.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A protective cover apparatus comprising:
    a cabinet for housing electronic devices including an outer wall;
    a cabinet opening formed in the outer wall and aligned with an open end of a cable trough positioned within the cabinet; and
    a planar member secured to the outer wall of the cabinet and covering the cabinet opening, the planar member including a front side, back side, a perforated portion, and a perimeter portion, the perforated portion substantially surrounded by the perimeter portion, the back side of the planar member including an adhesive material securing the planar member to the outer wall of the cabinet wherein the perforated portion includes a tab portion to allow for the removal of the perforated portion.

2. The apparatus of claim 1 wherein the outer wall of the cabinet is a top wall.

3. The apparatus of claim 1 wherein the planar member is comprised of a flexible, insulative material.

4. The apparatus of claim 3 wherein the flexible, insulative material is a polycarbonate.

5. A protective cover apparatus for covering an open end of a cable trough mounted in a cabinet for housing electronic devices comprising:
    a planar member for covering the open end of the cable trough including a front side, a back side, and an outer edge, the planar member including a perforated portion and a perimeter portion, the perforated portion substantially surrounded by the perimeter portion, the back side of the planar member including an adhesive material for securing the planar member to a wall of the cabinet wherein the perforated portion includes a tab portion to allow for the removal of the perforated portion.

6. The apparatus of claim 5 wherein the planar member includes a backing material covering the adhesive material.

7. The apparatus of claim 5 wherein the planar member is comprised of a flexible, insulative material.

8. The apparatus of claim 7 wherein the flexible, insulative material is a polycarbonate.

9. The apparatus of claim 5 wherein the tab portion extends to the outer edge of the planar member.

10. The apparatus of claim 9 wherein the planar member has a substantially rectangular shape.

11. The apparatus of claim 10 wherein the tab portion extends to a corner of the planar member.

12. The apparatus of claim 10 wherein the perforated portion has a substantially rectangular shape.

13. A method for covering an open end of a cable trough mounted in a cabinet for housing electronic devices comprising:

providing a planar member including a front side and a back side, the planar member including a perforated portion and a perimeter portion, the perforated portion substantially surrounded by the perimeter portion, the back side of the planar member including an adhesive material wherein the perforated portion includes a tab portion to allow for the removal of the perforated portion;

removing a backing material from the adhesive material; and applying the back side of the planar member to an outer wall of the cabinet.

14. A method for covering an open end of a cable trough mounted in a cabinet for housing electronic devices comprising:

providing the cabinet including an outer wall, a cabinet opening formed in the outer wall and aligned with the open end of the cable trough, a planar member secured to the outer wall of the cabinet and covering the cabinet opening, the planar member including a front side, back side, a perforated portion, and a perimeter portion, the perforated portion substantially surrounded by the perimeter portion, the perforated portion including a tab portion, the back side of the planar member including an adhesive material securing the planar member to the outer wall of the cabinet;

pulling the tab portion to remove the perforated portion; and exposing the cabinet opening and the open end of the cable trough to allow for the passage of a cable.

15. The method of claim 14 wherein the cable is a power cable, and routing the power cable through the cable trough and through the cabinet opening.

* * * * *